US009531725B2

(12) United States Patent
Deshmukh et al.

(10) Patent No.: US 9,531,725 B2
(45) Date of Patent: Dec. 27, 2016

(54) OPTIMIZING INFRASTRUCTURE SUPPORT BASED ON AUTHENTICATED ACCESS, VALIDATION AND CONTEXT RELATED INFORMATION RETRIEVAL

(71) Applicant: TATA CONSULTANCY SERVICES LIMITED, Mumbai, Maharashtra (IN)

(72) Inventors: Veena Sadashiv Deshmukh, Maharashtra (IN); Rahu Ramesh Kelkar, Maharashtra (IN); Upendra Vijay Sabnis, Maharashtra (IN); Neelam Bansal, Maharashtra (IN); Sudha VVL Kancharla, Maharashtra (IN); Mudit Dhagat, Maharashtra (IN)

(73) Assignee: TATA CONSULTANCY SERVICES, Mumbai (IN)

( * ) Notice: Subject to any disclaimer, the term of this patent is extended or adjusted under 35 U.S.C. 154(b) by 136 days.

(21) Appl. No.: 14/494,762

(22) Filed: Sep. 24, 2014

(65) Prior Publication Data
US 2015/0113628 A1 Apr. 23, 2015

(30) Foreign Application Priority Data
Oct. 17, 2013 (IN) .......................... 3265/MUM/2013

(51) Int. Cl.
H04L 29/06 (2006.01)
H04L 12/24 (2006.01)

(52) U.S. Cl.
CPC ......... H04L 63/102 (2013.01); H04L 41/5074 (2013.01); H04L 63/083 (2013.01)

(58) Field of Classification Search
CPC .......... H04L 63/0807; H04L 2463/081; H04L 63/083; H04L 41/5074; H04L 63/102

USPC .................................................. 726/10, 4, 19
See application file for complete search history.

(56) References Cited

U.S. PATENT DOCUMENTS

| 2002/0007300 A1 | 1/2002 | Slatter |
| 2007/0100782 A1 | 5/2007 | Reed et al. |
| 2009/0007145 A1* | 1/2009 | White ................. H04L 41/0631 719/318 |

(Continued)

OTHER PUBLICATIONS

"CISCO Prime Infrastructure", Deployment Guide, Jan. 2013 Troubleshooting, Monitoring & troubleshooting, Event History, Automating Packet Capture Using Cisco Prime Infrastructure, 69 pages.

(Continued)

*Primary Examiner* — Haresh N Patel
(74) *Attorney, Agent, or Firm* — Lee & Hayes, PLLC

(57) ABSTRACT fSystems and methods for infrastructure support optimization are described. The system includes an authorization module to verify a user, based on authorization rules, to provide access to the user to one or more infrastructure elements, and obtain ticket attribute data from a ticketing system, based on the verification, where the ticket attribute data comprises a plurality of attributes associated with a ticket to be resolved by the user. The authorization module also receives a support action, to be performed on the infrastructure element to resolve the ticket, where the support action includes at least one of an operation to resolve the ticket, and a standard support service. Further, the system includes a log generation module to append the support action to an operation log with corresponding ticket attribute data.

18 Claims, 5 Drawing Sheets

(56) References Cited

U.S. PATENT DOCUMENTS

| | | | |
|---|---|---|---|
| 2010/0218238 A1 | 8/2010 | Mouleswaran et al. | |
| 2010/0275054 A1* | 10/2010 | Grace ................. | G06Q 40/02 714/2 |
| 2011/0093367 A1* | 4/2011 | Stapleton ............ | G06Q 10/06 705/30 |
| 2011/0314440 A1* | 12/2011 | Singhal ............... | G06Q 10/06 717/101 |
| 2012/0060207 A1* | 3/2012 | Mardikar ............. | G06F 21/33 726/4 |
| 2014/0039958 A1* | 2/2014 | Bivens ................ | G06Q 10/06 705/7.15 |
| 2014/0180678 A1* | 6/2014 | Marian ................ | G06F 17/2735 704/10 |
| 2015/0213287 A1* | 7/2015 | Anderson ............ | G06F 21/31 726/19 |
| 2015/0363158 A1* | 12/2015 | Satake ................ | G06F 21/10 700/94 |

OTHER PUBLICATIONS

"Oracle Workflow Administrator's Guide", (Release 2.6.4; Part B15852-02), Jun. 2005. Relevant: Classes of users and their privileges (p. 178), Viewing Error Information for a Workflow (p. 212), 308 pages.

Guangjian, "Cross Search: A Web-based system for integrated access to multiple heterogeneous information sources", RCDL Oct. 2006,Relevant, p. 2, p. 3, Figure-1, 7 pages.

\* cited by examiner

| USER | TICKET_ID | TICKET_CATEGORY | TICKET_TYPE | TICKET_SUMMARY | SOURCE | CMD | RULE | DETAILS |
|---|---|---|---|---|---|---|---|---|
| user_1 | T9004501 | IS-SERVER | UX-LINUX-ISSUES | HIGH MEMORY USAGE | User | top | | |
| user_1 | T9004501 | IS-SERVER | UX-LINUX-ISSUES | HIGH MEMORY USAGE | App | top | | pass |
| user_1 | T9004501 | IS-SERVER | UX-LINUX-ISSUES | HIGH MEMORY USAGE | User | ps -ef \| grep ssh | | |
| user_1 | T9004501 | IS-SERVER | UX-LINUX-ISSUES | HIGH MEMORY USAGE | App | ps -ef \| grep ssh | | pass |
| user_1 | T9004501 | IS-SERVER | UX-LINUX-ISSUES | HIGH MEMORY USAGE | User | kill -9 12330 | | |
| user_1 | T9004501 | IS-SERVER | UX-LINUX-ISSUES | HIGH MEMORY USAGE | App | kill -9 12330 | | pass |
| user_1 | T9004501 | IS-SERVER | UX-LINUX-ISSUES | HIGH MEMORY USAGE | User | free -m | | |
| user_1 | T9004501 | IS-SERVER | UX-LINUX-ISSUES | HIGH MEMORY USAGE | App | free -m | | pass |
| user_1 | T9004501 | IS-SERVER | UX-LINUX-ISSUES | HIGH MEMORY USAGE | User | exit | | |
| user_1 | T9004501 | IS-SERVER | UX-LINUX-ISSUES | HIGH MEMORY USAGE | App | exit | | pass |
| user_1 | T9004501 | IS-SERVER | UX-LINUX-ISSUES | HIGH MEMORY USAGE | kBase | | | 1 cases found |
| user_2 | T9003502 | IS-SERVER | UX-LINUX-ADMINISTRATION | SERVER NOT RESPONDING | User | service ftpd status | | |
| user_2 | T9003502 | IS-SERVER | UX-LINUX-ADMINISTRATION | SERVER NOT RESPONDING | App | service ftpd status | | pass |
| user_2 | T9003502 | IS-SERVER | UX-LINUX-ADMINISTRATION | SERVER NOT RESPONDING | User | ping 10.0.3.159 | | |
| user_2 | T9003502 | IS-SERVER | UX-LINUX-ADMINISTRATION | SERVER NOT RESPONDING | App | ping 10.0.3.159 | | pass |
| user_2 | T9003502 | IS-SERVER | UX-LINUX-ADMINISTRATION | SERVER NOT RESPONDING | User | service ftpd restart | | |
| user_2 | T9003502 | IS-SERVER | UX-LINUX-ADMINISTRATION | SERVER NOT RESPONDING | App | service ftpd restart | | pass |
| user_3 | T2001508 | IT SERVICES | UX-LINUX-ADMINISTRATION | SERVER NOT RESPONDING | User | reboot1 | | |
| user_3 | T2001508 | IT SERVICES | UX-LINUX-ADMINISTRATION | SERVER NOT RESPONDING | RuleEngine | reboot1 | askForPassword | fail |
| user_3 | T2001508 | IT SERVICES | UX-LINUX-ADMINISTRATION | SERVER NOT RESPONDING | App | reboot1 | | fail |
| user_3 | T2001508 | IT SERVICES | UX-LINUX-ADMINISTRATION | SERVER NOT RESPONDING | User | rmdir /new2 | | |
| user_3 | T2001508 | IT SERVICES | UX-LINUX-ADMINISTRATION | SERVER NOT RESPONDING | RuleEngine | rmdir | disallowCommand | fail |
| user_3 | T2001508 | IT SERVICES | UX-LINUX-ADMINISTRATION | SERVER NOT RESPONDING | App | rmdir /new2 | | fail |

Fig. 3

OPTIMIZING INFRASTRUCTURE SUPPORT BASED ON AUTHENTICATED ACCESS, VALIDATION AND CONTEXT RELATED INFORMATION RETRIEVAL

TECHNICAL FIELD

The present subject matter relates, in general, to infrastructure support and in particular, to systems and methods for controlling infrastructure support services.

BACKGROUND

Information technology (IT) has grown from many years and today, IT serves as a backbone for entire business structure. The execution of the business processes lie at the very heart of the day-to-day operations of an organization. Further, many business processes rely on the IT to an extent that the business processes may cease to operate without a properly functioning IT system.

The functioning of the IT system may be based on infrastructure in the organization. The infrastructure of the IT system refers to basic support system that is shared among all users involved in the business process. Typically, IT infrastructure of an organization includes basic set of components, which are shared by all IT business applications. The IT infrastructure not only refers to hardware, but also includes a combined set of elements, such as software, hardware, networks, facilities, and information, in order to develop, test, deliver, monitor, control, and support IT services.

Generally, organizations consider the IT infrastructure as an important and integral part for functioning of an organization. Accordingly, the organizations set-up IT infrastructure support to maintain the IT infrastructure elements. Further, the IT infrastructure support may be optimized to offer better services, which are focused on managing the IT infrastructure elements.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods, in accordance with embodiments of the present subject matter, are now described by way of example only, and with reference to the accompanying figures, in which:

FIG. 3 illustrates an example of an operation log generated by the infrastructure support optimization system, in accordance with an embodiment of the present subject matter.

DETAILED DESCRIPTION

Figure 1:
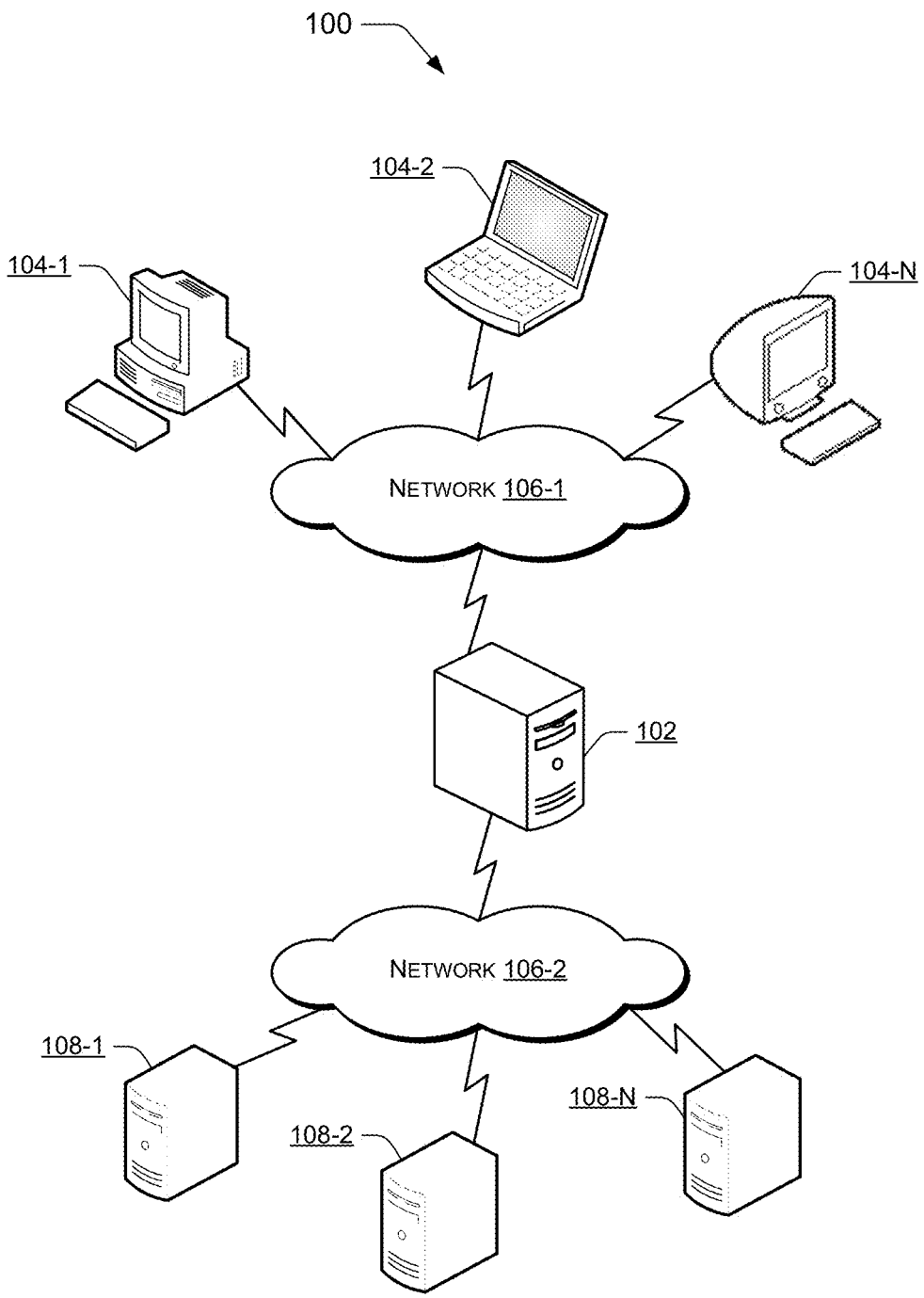
FIG. 1 illustrates a network environment implementing an infrastructure support optimization system, in accordance with the embodiment of the present subject matter.

System(s) and method(s) for controlling of infrastructure support services are described herein, where the controlling includes managing support services provided to infrastructure, transparency in the provided services, and optimization of the support services. The systems and methods described herein can be implemented on computing devices, including, but not limited to, servers, desktop computers, hand-held devices, mobile devices, notebooks, and laptops.

Information technology (IT) infrastructure of an organization typically include infrastructure elements, such as software, hardware, and other components, which may be used to deliver IT services to its customers. Generally, an efficient delivery of the IT services requires proper support from a set of infrastructure tools, which perform operations on the infrastructure elements. Often times, delivery of IT services may be interrupted due to various reasons, for example, due to malfunctioning of one of the infrastructure elements. Each such interruption may be resolved individually and may be done by way of a ticketing system that allots a ticket identification number or a code, to each interruption or to say to each IT service related issue.

The allotted tickets may be allocated to a production support team. Further, typically, each production support team may share a common access credential, such as user identification name and password, to remotely connect to an infrastructure element to address the issue. The process of resolving the issue involves input of several codes and commands by one or more members in the support team. At times, the members may inadvertently input few inappropriate commands, which may lead to further issues in the infrastructure element. Furthermore, such issues in the infrastructure element may disrupt organizational processes and may cause damages in terms of finance, reputation, etc.

Typically, various operations being performed on infrastructure elements may be appended to a log that is maintained at individual infrastructure elements. Such logs may include information, such as start time of operation, end time of operation, date and day of performing operation. The logs from each infrastructure element may be used for monitoring purposes. However, such logs require monitoring process on individual infrastructure element, which limits collective or coherent monitoring of operations. Further, such logs may not provide precise and complete information about the operations. For example, since all the members of the team share a common access credential, identifying a member responsible for input of the inappropriate command, on an infrastructure element, remains as a challenge, during the monitoring process. Due to lack in accountability, ability to control the processes or operations performed by the team of users remains limited. Incorporation of any improvement or any attempt to reduce possibility of such situations becomes difficult as the issues may occur frequently from various users. In addition, all the users of the production support team may be allowed to execute operation on all the infrastructure elements. In such conditions, a user with less experience in handling certain issues may also try to resolve the issues in certain infrastructure elements, by performing certain operations. Due to limitation of restriction in access to infrastructure elements, certain operations may result in malfunctioning of the infrastructure element.

Further, often times same issue may be resolved multiple times using similar operations; however at each instance of the same issue, a user from the support team may have to analyze the issue and provide the operation to resolving without benefitting from previous actions that are performed to resolve the issue. This in turn may affect the efficiency of the support services.

According to an implementation of the present subject matter, systems and methods for infrastructure support optimization are described herein. On one hand, the described systems and methods provides authenticated and controlled access to the users and on other hand, the methods may also provide context related information to a user. In an implementation, users of a production support team are verified based on authorization rules which include primary level authorization, and secondary level authorization. The primary level authorization may be performed based on user identification (user id) and password, to provide authorized access to users of a production support team to one or more infrastructure elements. The secondary level authorization may be performed based on role of the user in the production support team, to provide a controlled access to the user for particular infrastructure elements from among the one or more infrastructure elements.

In an implementation, the user may be provided with a single point access to various infrastructure elements, to perform operations on various server platforms, such as Windows®, Unix®, and Linux®. Each server platform may be associated with one or more infrastructure elements. The server platforms and the infrastructure elements associated with the server platforms may be made available to the user for accessing, based on the secondary level authorization. Subsequently, a ticket is created for each issue in the infrastructure elements, which needs to be resolved by the production support team. The tickets may be allotted to the users, for resolving the issue associated with the tickets. In an example, users may be notified regarding the issues associated with the infrastructure elements, and the users may be allowed to create a ticket, from a ticketing system, for each issue. In one implementation, the tickets may be allotted to each user of the production support team, and the user may be notified regarding the allotted tickets after the primary level authorization. Further, the user may be provided with ticket attribute data such as, ticket id, ticket category, ticket type, ticket summary, and the like.

In order to resolve the issue associated with the allotted tickets, the user may perform support action on the infrastructure elements. The support action may either be user driven, knowledgebase driven, or may be a standard support service. User driven support action may be understood as operations performed by the user himself, and knowledgebase driven support action may be understood as operations performed by using available solutions as a reference. The user may search in the knowledgebase, for available solutions, such as knowledge articles, or available steps for resolving the issue. Knowledgebase may be defined as a knowledge repository, and may either be a static knowledgebase or a dynamic knowledgebase. The static knowledgebase may be understood as a repository of information which helps the user to refer to usual steps of resolving the issue. In an example, the static knowledgebase may be a web-based service used to fetch available information on the issue associated with the ticket. The available information may be fetched in the form of knowledge articles, or standard operating procedures. The dynamic knowledgebase is a repository of all operations performed by all users of the production support team, in resolving one or more issues associated with the infrastructure elements. When the user searches in the knowledgebase, be it static knowledgebase or dynamic knowledgebase, one or more ticket attributes of the ticket may be associated with the search. Based on the ticket attributes, the knowledgebase may retrieve one or more available solutions for resolving the issue. The retrieved steps may be referred to as context related information, as the retrieved information is pertaining to the issue.

Further, apart from searching in knowledgebase, the user may be allowed to execute standard services which are fetched from a service catalog. The service catalog provides to the user, a categorized list of services that are included as standard services for the infrastructure elements. The standard services fetched from the service catalog may be based on ticket attributes of the ticket. In cases where there are no appropriate steps provided to the user, either by the knowledgebase, or by the service catalog, the user may choose to resolve the issue himself. For example, a service may be required to be performed, such as performing compliance check on the server. Such service requests may also be generated as tickets and may be allotted to the users. In order to attend to such service requests, the user may utilize the standard services from the service catalog.

In one implementation, every step that the user performs, in a process for resolving the issue, may be subjected to validation rules. The validation rules may be understood as the rules that are defined for purpose of avoiding inadvertent human errors, and to provide controlled execution of operations on the infrastructure elements. The validation rules may be specified for a specific user, role of the user, and an infrastructure element on which the operation is to be performed. In an implementation, when the user tries to execute an operation, the operation may be subjected to validation rule check, to determine if there is any validation rules associated with the operation. In order to satisfy the validation rule check, the user may be notified with a validation message. In an example, the validation message may request the user to provide a password for execution of the operation. In case the validation rule check is satisfied, the operation may be executed on the infrastructure element, and otherwise the operation may be declined. Such precise validations enhance enforcement of control over the operations that each user performs on the infrastructure element.

Further, every operation performed by the user may be captured and appended to an operation log, which functions as the dynamic knowledgebase. In an example, the operations performed by the user and corresponding validation rule checks may also be appended to the operations log. As mentioned earlier, the dynamic knowledgebase functions as a repository of information pertaining to support actions performed on various infrastructure elements by various users, and may help in retrieval of the context related information. The operation log includes the information in a manner so as to facilitate easy retrieval of the collected information, based on the ticket attributes. In an example, the knowledgebase may be realized with a relational database management system (RDBMS), to facilitate extraction of related information. Such retrieval and extractions help in better resolving of the issue and thus save time. Furthermore, since the operation log includes operations performed by every user of the production support team, monitoring the log become easier and enhances better auditing. Thus, the method(s) described herein provides controlled, transparent, and optimized infrastructure support to the production support team of an organization.

While aspects of described system(s) and method(s) of infrastructure support optimization system can be implemented in any number of different computing systems, environments, and/or configurations, the implementations are described in the context of the following exemplary system(s) and method(s).

FIG. 1 illustrates a network environment 100 implementing an infrastructure support optimization system 102, hereinafter referred to as system 102, in accordance with an embodiment of the present subject matter. In one implementation, the network environment 100 can be a public network environment, including various servers and computing devices. In another implementation, the network environment 100 can be a private network environment with a limited number of computing devices, such as personal computers, servers, laptops, and/or communication devices, such as mobile phones and smart phones.

In one implementation, the system 102 may be communicatively connected to user devices 104-1, 104-2, . . . , 104-N, corresponding to users in one or more production support teams, through a network 106-1. The user devices 104-1, 104-2, . . . , 104-N may be hereinafter individually and commonly referred to as user device(s) 104. The user device(s) 104 may include multiple applications that may be running to perform several functions, as needed by different users and individual organizations. The user device 104 may be implemented as, but are not limited to, desktop computers, hand-held devices, laptops or other portable computers, tablet computers, and the like. Similarly, the system 102 may be communicatively connected to one or more infrastructure elements 108-1, 108-2, . . . , 108-N, hereinafter referred to as infrastructure element(s) 108, through the network 106-2. In said implementation, the user device 104 is communicatively connected to the one or more infrastructure elements 108 via the system 102.

The network 106-1 and 106-2 may be a wireless or a wired network, or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

In an implementation, one or more issues associated with the infrastructure elements 108 may be determined, and allotted to the users of the production support team for resolving the issues, by communicating with the user devices 104. In one implementation, tickets may be created in a ticketing system (not shown in the figures) for the determined issues. The generated tickets may be allotted to the users, for resolving the issues associated with the tickets. In an example, users may be notified regarding the issues associated with the infrastructure elements, and the users may be allowed to create a ticket, from a ticketing system, for each issue. In one implementation, the generated tickets may be allotted to each user of the production support team, and the user may be notified regarding the allotted tickets.

Each ticket generated in the ticketing system may be associated with ticket attribute data which includes, but not limited to, ticket id, ticket category, ticket type, and ticket summary. Further, in order to resolve the issue, each user of the production support team may be verified with unique login credentials, which provides a controlled access to the infrastructure element 108 via the system 102. The infrastructure element 108 may include one or more server platforms, such as Windows®, Unix®, and Linux®. When the user device 104 is connected to the infrastructure elements 108 through the system 102, the system 102 functions as a proxy console for communication between the user device 104 and the infrastructure element 108. In such a scenario, user can access one or more infrastructure elements 108, with one time login.

In one implementation, a support action may be received, to be executed on the infrastructure elements 108. The support action may either be an operation performed by the user himself, or an operation performed by using search results from a knowledgebase. Further, every operation performed by the user on the infrastructure elements 108 may be appended to an operation log with corresponding ticket attribute data.

Figure 2:
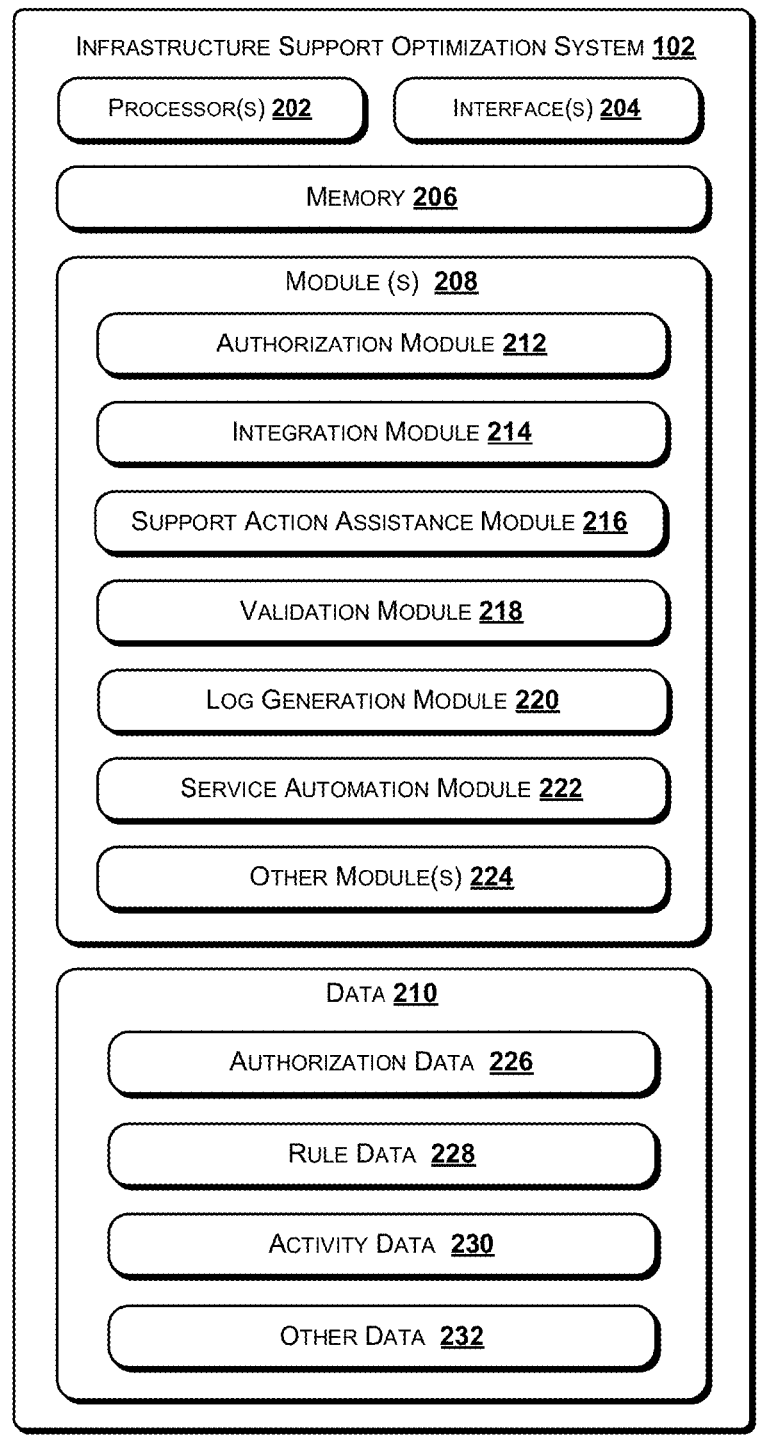
FIG. 2 illustrates components of the infrastructure support optimization system, in accordance with the embodiment of the present subject matter.

FIG. 2 illustrates components of the infrastructure support optimization system 102, according to an embodiment of the present subject matter. In one implementation, the system 102 includes processor(s) 202, interface(s) 204 and a memory 206. The processor(s) 202 can be a single processing unit or a number of units, all of which could include multiple computing units. The processor(s) 202 may be implemented as one or more microprocessor, microcomputers, digital signal processors, central processing units, state machines, logic circuitries, and/or any devices that manipulate signals based on operational instructions. Among other capabilities the processor(s) 202 are adapted to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, Application Specific Integrated Circuit (ASIC), Field Programmable Gate Array (FPGA), Read Only Memory (ROM) for storing software, Random Access Memory (RAM), non-volatile storage. Other hardware, conventional and/or custom, may also be included.

The interface 204 may include a variety of software and hardware interfaces, for example, interface for peripheral device(s), such as a keyboard, a mouse, a microphone, an external memory, a speaker, and a printer. Further, the interface(s) 204 may include one or more ports for connecting the system 102 with other computing devices, such as web servers, and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may be coupled to the processor 202 and may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes.

The system 102 may also include module(s) 208 and data 210. The modules 208 and the data 210 may be coupled to the processor(s) 202. The modules 208, amongst other things, include routines, programs, objects, components, data structures, etc., which perform particular tasks or implement particular abstract data types. The modules 208 may also be implemented as, signal processor(s), state machine(s), logic circuitries, and/or any other device or component that manipulate signals based on operational instructions.

In another aspect of the present subject matter, the modules 208 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

The module(s) 208 includes, for example, an authorization module 212, an integration module 214, a support action assistance module 216, a validation module 218, a log generation module 220, a service assistance module 222, and other module(s) 224. The other module(s) 224 include programs that supplement applications or functions performed by an infrastructure support optimization system, such as system 102. The data 210 serves, amongst other things, as a repository for storing data obtained and processed by one or more module(s) 208. The data 210 includes, for example, authorization data 226, rule data 228, activity data 230, and other data 232. The other data 232 includes data generated as a result of the execution of one or more modules in the other module(s) 224.

According to an implementation, a user from a production support team may be verified with login credentials, by the authorization module 212, to provide access to one or more infrastructure elements 108, via the system 102. The verification may be based on certain authorization rules, which include, for example, primary level authorization and secondary level authorization. The authorization rules may be stored in the authorization data 226. The primary level authorization may be performed based on the user id provided by the user, and secondary level authorization is performed based on a user attribute, such as role or designation of the user, to provide controlled access to the infrastructure elements 108. For the purpose of verification, the login credentials and role of all the users of the production support team may be stored in the authorization data 226. In an example, the authorization module 212 may authenticate the user with single sign-on (SSO). The SSO provides access to the infrastructure elements 108 without asking the user to input login credentials at each stage of access.

In an implementation, the integration module 214 integrates the system 102 with external tools (not shown in figures) through application programming interfaces (APIs) provided by each of the external tools. In cases where the external tools provide API libraries and web services for integration, the integration module 214 may interact with the external tools through the API libraries and the web services. Examples of the external tools include, but are not limited to, a configuration management database (CMDB), a ticketing system, and a static knowledgebase. In order to facilitate efficient resolving of tickets, the dependency tree, access to the knowledgebase, such as a button-click or link, and the list of server platforms, may be provided in a unified screen layout in the user device 104.

The CMDB may be understood as a database that includes information pertaining to configuration and components of the infrastructure elements 108. The components of the infrastructure elements 108 may be referred to as configurable items (CI). Since the system 102 is integrated with the CMDB, the integration module 214 may provide a dependency tree, or dependency graph, to the user, which indicates various applications that are hosted by the server platform, and various network devices that are connected to the server platform. Such information regarding the server platform may be used for troubleshooting purpose, by the user. In an example, the CMDB may also provide information regarding the various server platforms, to which the user has access, based on the secondary level authorization.

Further, the ticketing system can be understood as a system that tracks issues relating to the infrastructure elements 108. Each issue tracked or identified may be logged by the ticketing system as a ticket, and each ticket may be allotted a unique identification number, which is referred to as ticket id. The user of the production support team may be allotted one or more tickets. Once the user is verified based on primary level authorization, the user may be exposed to a list of allotted tickets, on the user interface of the user device 104. For each ticket allotted to the user, the integration module 214 may fetch attributes of the ticket from the ticketing system, and provide it to the user. The ticket attributes may be defined as one or more characteristics of the ticket which indicate the issue associated with the ticket. The ticket attributes may include, but not limited to, ticket category, ticket summary, ticket type and the like. It will be appreciated that the various examples listed here are only for the purpose of explanation and not as a limitation. Further, names and types of ticket attributes may be changed based on configuration of the ticketing system.

Further, the user may select a ticket, from among the list of tickets, for resolving the issue associated with the ticket. Subsequently, the ticket attributes may be fetched, by the integration module 214, from the ticketing system, and the user may be navigated, through the system 102, to the infrastructure element 108 having the issue.

In order to resolve the issue associated with the ticket, the user performs a support action on the infrastructure element 108 corresponding to the allotted ticket. The support action may either be a user driven operations, or knowledgebase (KB) driven operations. The user driven operations may be understood as those operations which the user performs himself through input of one or more commands based on his analysis, and the KB driven operations may be understood as those operations which the user performs by using few available solutions. The available solutions retrieved from the knowledgebase, are provided to the user as a reference, for resolving the issue. The knowledgebase acts as a repository for context-related information collection, and helps in easy retrieval of the collected information.

The knowledgebase includes the static knowledgebase, which is provided as an external tool, and a dynamic knowledgebase, which may be provided by way of an operation log. The static knowledgebase may be a web-based service which helps the user to access available solutions with steps for resolving the issues. In an implementation, the integration module 214 may provide access to the static and dynamic knowledgebase through an interface, such as a button or a key named as 'Search' and 'Knowledgebase'. In case where the user searches for available solution in the static knowledgebase, the support action assistance module 216 may obtain a request, from the user, for the search in form of a search query. For the purpose of searching, one or more ticket attributes may be associated with the search query. Based on the ticket attributes, the support action assistance module 216 may retrieve available solution from the static knowledgebase.

Similarly, the user may also choose to search for available solutions or available information in the dynamic knowledgebase. The dynamic knowledgebase may be provided by way of an operation log, which functions as a repository of previously appended operations performed by the users of the production support team, as will be explained in detail later. Every operation performed by the users on the infrastructure elements 108, is appended to the operation log with corresponding ticket attributes.

When the support action assistance module 216 obtains the search query for searching available steps in the dynamic knowledgebase, one or more ticket attributes may be associated with the search query. Subsequently, the support action assistance module 216 may analyze the operation log to identify one or more operations, based on the ticket attributes. For example, the ticket attribute may be ticket category, and the support action assistance module 216 may analyze the operation log to identify operations which match with the ticket category. In addition to ticket attributes, the search query may also include user id, one or more attributes of infrastructure elements 108, date range, and session id. The identified operations may be indicative of a procedure, steps, or a set of commands for resolving the ticket. The retrieved available solutions from the knowledgebase may be provided to the user as a reference for resolving the issue.

The operational log may be defined as a log of operations history which includes steps of multiple operations performed by one or more users, in resolving issues associated with the infrastructure elements 108. The operation log may include one or more operations which have been performed previously for resolving a same issue or a similar issue, to that of the issue being resolved by the user. The previously appended operations for the same issue will also be appended with ticket attribute data, for example, ticket category or ticket type. Thus, when the support action assistance module 216 analyzes the operation log for available solutions for resolving the issue associated with the ticket, one or more attributes of the ticket may be matched with one or more appended operations in the operation log. When a match for one or more attributes of the ticket is satisfied, the steps or procedure associated with the operations may be fetched from the operation log and provided to the user, on the user device 104. In an example, one or more operations may be fetched, and user may select appropriate operation as reference, from among the fetched operations. Such operations fetched by the support action assistance module 216 may be referred to as context related operations/context related information, may be considered relevant for resolving the issue associated with the ticket. Further, the user may be allowed to view the steps and procedure associated with the selected operation, and uses them as reference to resolve the issue. For instance, the selected operation may guide the user in resolving the issue. In case where the issue is similar to the issue to be resolved, the user will be able to perform similar steps associated with the selected operation.

Thus, owing to provision of querying the knowledge base, which, in addition to including static information also includes dynamically updated information, may reduce the time and efforts needed for resolving the ticket, thereby providing an efficient infrastructure support system. This in turn may reflect better functioning of the underlying infrastructure elements. The context related operations help in better resolving of the issues.

In addition to referring the retrieved solutions and identified operations, the user may also be allowed to execute standard services from a service catalog. The system 102 may also be integrated to the service catalog which provides to the user, a categorized list of services that are included as a support service for the infrastructure elements 108. The service catalog may also include description of the services, categorization of the services, and indicate steps to avail the services. In one example, a set of services may be included as standard services in the service catalog, by the production support team, in offline mode. The inclusion of services as standard services may be subjected to one or more criteria, based on which the production support team may determine to include the service in the service catalog. When the user searches for available standard services in the service catalog, based on the ticket attributes, one or more standard services corresponding to the same or similar issue, may be provided to the user. Once the user selects a provided standard service, the operation or commands associated with the standard service may be executed immediately to resolve the issue. In one example, when a set of services are provided to the user, the user may be allowed to select one or more services from the categorized list of standard services, and execute the services on the infrastructure elements. Such standard services facilitate efficient resolving of issues.

In one implementation, upon receiving the support action, the validation module 218 may perform a validation rule check on the received support action. Validation rules may be defined as a formula or expression that evaluates the received support action based on certain standards for execution of operation, which may be specified by the production support team personnel, or the organization itself. The validation rules may be defined for a specific user, role of the user, and an infrastructure element 108 on which the support action is to be performed. In one example, validation rules may be defined for sensitive or potentially dangerous operations, and may be stored in the rule data 228. Based on the secondary level authorization, the user may be provided access to few infrastructure elements 108, or few server platforms. In addition to such controlled access, the validation rules help in controlled execution of commands, or operations, on the infrastructure elements 108. Further, such validation rules protect against inadvertent human errors, which may lead to further issues in the infrastructure elements 108. For example, if a major bank's server which is communicating with several ATMs is rebooted by mistake, the ATMs and online bank services would cease to function. Further, unintended execution of such sensitive operation leads to issues. In another example, the user may input a command 'rmdif', which when executed may remove a directory which is interfaced with the server platform. Furthermore, before executing the operation on the infrastructure element 108, based on validation rules defined for the infrastructure element 108, the user may be provided a validation message and may be prompted to provide response. In one example, the response may be a confirmation, such as 'Proceed' or 'Cancel', or a password for further authorization. Accordingly, the execution of the support action on the infrastructure element 108 may be subject to the response.

In one implementation, the validation message may request the user to enter password for execution of the operation. For example, the validation message may simply recite "Enter Password", or "Confirm to proceed" followed with options 'Confirm' and 'Cancel'. The passwords needed for the execution of certain commands may be stored in the rule data 228, by the production support team personnel. In such cases of validation rule check through validation message, the validation module 218 may validate the response with rule data 228 and ascertain if the response to such messages, such as the password, is satisfied. In case the response from the user to such validation messages are not satisfied, the validation module 218 may decline the operation, and notify the user regarding such declination of operation. For example, when the execution of the operation is declined, the validation module 218 may notify the user with a validation message which may recite "Not allowed to execute", or "Fail". Alternatively, the validation module 218 may execute the operation, either, when there are no validations rule associated with the operation, or when the commands are ascertained to be non-sensitive.

In one implementation, the execution of few operations by certain users on certain infrastructure elements 108 may be considered sensitive. For example, an operation-1 by the user-1 on server-1 may be considered as sensitive. In such cases, validation rules may be defined for combination of users and servers and may be stored in the rule data 228. Validation rules may be defined at role level as well. Thus, the execution and restriction of the operation on various server platforms, or infrastructure elements 108, may be subjected to validation rules. In case the validation module 218 determines a validation rule associated with execution of an operation, the validation module 218 may notify the user, regarding the validation check, with a validation message. In another example, the operation may be directed towards deleting a file from a directory. The validation rule check may also be directed towards size of the file to be deleted. For example, the system 102, based on the validation rule, may disallow the user to delete the file of size exceeding a predefined threshold. Although the validation rules are described herein with respect to specific examples, it will be appreciated that the validation rules are not limited to the specific example, and may be implemented in various other ways to provide a controlled access to the users.

In an implementation, the log generation module 220 may capture every operation performed by the user to resolve the issue, and may append the captured operations in the operation log which may be stored in the activity data 230. Further, the log generation module 220 may associate every appended operation with the corresponding ticket attributes. The operation log with operations associated with the ticket attributes may function as the dynamic knowledgebase.

Apart from the appended operations, the operation log may also include date and time; user id; session id; support action performed by the user on the ticket; server attribute data and other details. The other details may include comments, such as 'Pass' or 'Fail', which indicates if the execution of operation on the infrastructure element 108 was successful or otherwise. The details pertaining to various components of the operation log has been explained in detail with reference to FIG. 3. Further, details regarding the user, such as user name and user id, may also be included in the operation log to create an efficient operation log. In one example, the operation log may also indicate the validation rule check performed against each operation, and corresponding validation message. Since, the operation log includes details about the ticket, the user, and the operations performed on the server platform, accounting as to which user has performed which operation on which server platform, becomes easier. Accordingly, a user who has input inappropriate commands may be identified and may be subjected to training In another example, the operation log may be used to determine time duration involved for process of resolving a similar kind of ticket by each of the users and based on the determination a time efficient way of resolving the ticket may determined. Further, the user when resolved the ticket may be requested to train other members.

In one implementation, the service assistance module 222 may analyze the operation log, based on recurrence criteria, to determine if there are any recurring operations, performed by one or more users, which are appended to the operation log. The recurrence criteria may be defined as a criteria based on which, an operation which has been performed more than a threshold number of times in a predetermined time interval, may be identified. The threshold number and the predetermined time interval may be defined by a user, say, production support team personnel. Accordingly, the service assistance module 222 may analyze the operation log on a periodic basis, say, after every predetermined time interval. For example, the service assistance module 222 may determine that an operation-1 has been appended more than a pre-determined number of times over the pre-determined interval in the operation log. In such case, the operation-1 may be considered as recurring operation.

Further, in an example, the service assistance module 222 may store such recurring operations in the activity data 230, and notify the production support team personnel. The recurring operations stored in the activity data 230 may be analyzed offline, by the production support team personnel. Based on the offline analysis, the production support team personnel may indicate to the system 102 to provide one or more recurring operations, from among the recurring operations stored in activity data 230, as standard service. On receiving such indication, the service assistance module 222 may provide the recurring operations as a standard service in the service catalog.

FIG. 3 illustrates an operation log 300, in accordance with an embodiment of the present subject matter. For the sake of brevity only few columns have been illustrated in the operation log; however, it will be understood that many other columns may be added or certain columns may also be deleted. The operation log 300 depicts USER 302, which indicates a user performing an operation. The USER 302 may also include user id, which is unique to every user. In an example, the user id may be obtained from the login credentials provided by the user, while logging in the system 102. The operation log 300, as mentioned earlier, includes the ticket attributes, such as ticket id 304, ticket category 306, ticket type 308, and ticket summary 310. In an example, the ticket attribute data may be provided the by the user. Alternately or additionally, the attribute data may be fetched by the system 102.

Source 312 depicted in the operation log 300 indicates a point of initiation of the appended operation, and the progress of the operation till the execution. For example, one of the appended operations in the operation log 300 illustrates the source 312 as 'K(Base' against user_1. Such operation may indicate that the user has searched for available solutions in the knowledgebase. Similarly, the operation log 300 may also indicate the standard services executed from the service catalog as 'Catalog'.

The last three columns of the operation log 300 depict command (CMD) 314, Rule 316, and Details 318. The CMD 314 indicates the command input by the corresponding user in the first column. As can be seen in the FIG. 3, when the 'user_3' attempts to input a command 'reboot1' on a specific server, the support action validation module 218, may determine that the operation received from the 'user_3', on that specific server, is associated with validation rules. The log generation module 220 may capture the command and append it to the operation log 300 under CMD 314. Further, as depicted under the Rule 316, the 'user_3' may be prompted to provide a password when the command 'reboot1' is provided. Based on the validation, the command may be executed. The Details 318 in the operation log 300 depicts a status of execution such commands, such as 'pass' or 'fail'. Since the operation log is appended with all information regarding the resolving of an issue of a ticket, auditing the production support team may be easier. Further, the Details 318 may help, a person who audits, to identify the user whose execution of operation denotes a 'fail' status, and may investigate in case of repeated failure attempts. In an example, the operation log may also include time duration of an operation performed by a user to resolve an issue. The audit person may identify an operation from the operation log which involves less time to resolve an issue, and use the steps of the operation to train other users.

Figure 4:
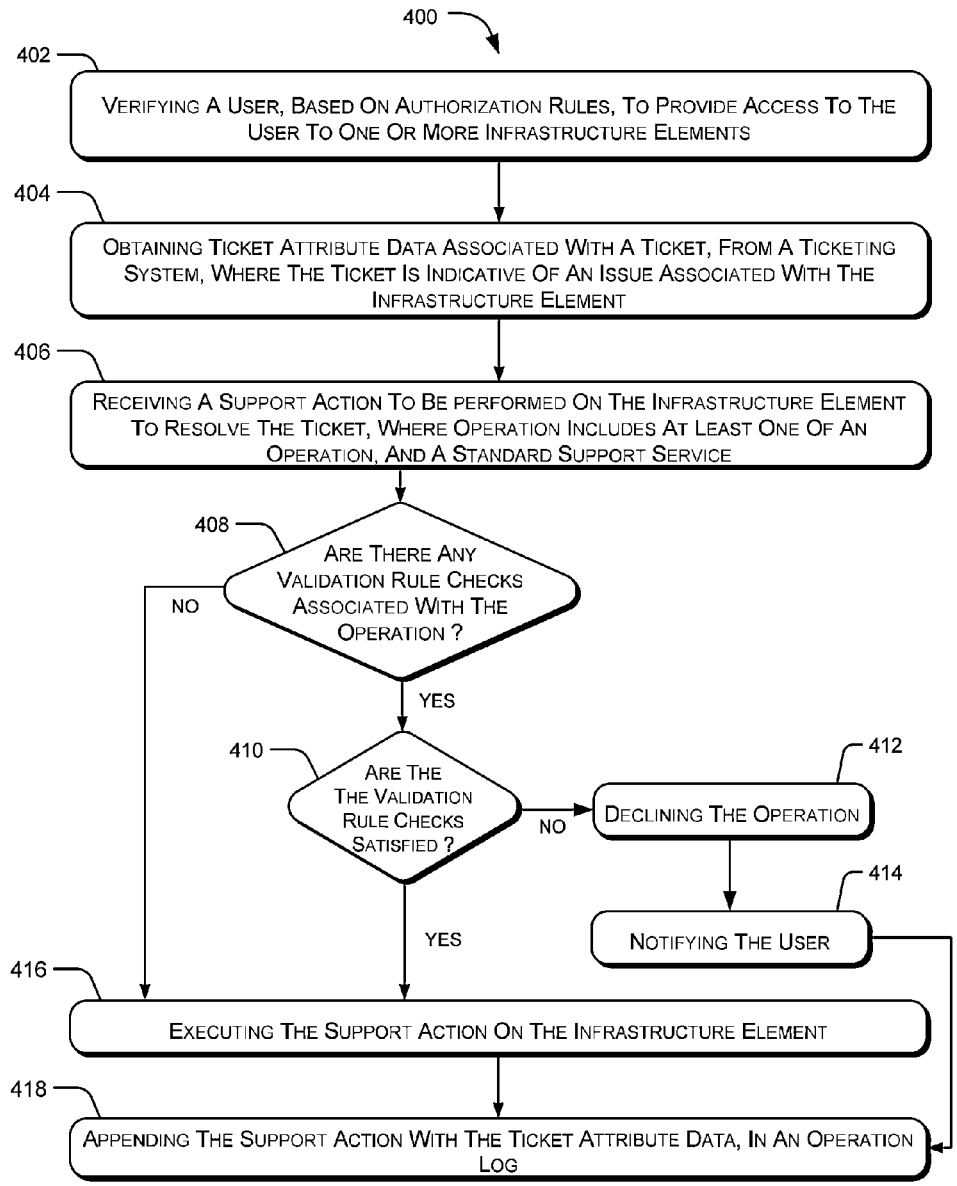
FIG. 4 illustrates a method for providing support for infrastructure elements, in accordance with an embodiment of the present subject matter.
Figure 5:
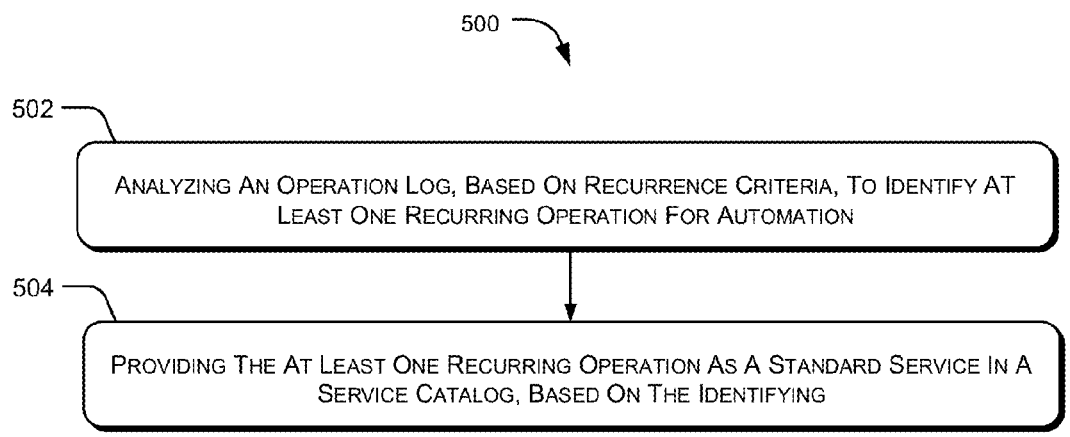
FIG. 5 illustrates a method for providing operations as services, using an operation log, in accordance with an embodiment of the present subject matter.

FIG. 4 and FIG. 5 illustrates method 400 and 500, respectively, in accordance with an embodiment of the present subject matter. According to an aspect, the concept of infrastructure support optimization are described with reference to the infrastructure support optimization system 102 described above.

The method(s) 400 and 500 may be described in the general context of computer executable instructions. Generally, computer executable instructions can include routines, programs, objects, components, data structures, procedures, modules, functions, etc., that perform particular functions or implement particular abstract data types. The method(s) 400 and 500 may also be practiced in a distributed computing environment where functions are performed by remote processing devices that are linked through a communications network. In a distributed computing environment, computer executable instructions may be located in both local and remote computer storage media, including memory storage devices.

The order in which the method(s) is described is not intended to be construed as a limitation, and any number of the described method blocks can be combined in any order to implement the methods 400 and 500, or an alternative method. Additionally, individual blocks may be deleted from the methods without departing from the spirit and scope of the subject matter described herein. Furthermore, the methods 400 and 500 can be implemented in any suitable hardware, software, firmware, or combination thereof. The methods 400 and 500 are explained with reference to the system 102, however, it will be understood that the methods can be implemented in other systems as well.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, (for example, a memory), and executes those instructions, thereby performing one or more method(s), including one or more of the method(s) described herein. Such instructions may be stored and/or transmitted using any of a variety of known computer-readable media.

FIG. 4 illustrates the method 400 for providing support for infrastructure elements 108, in accordance with an embodiment of the present subject matter. In an example, the method 400 may be performed by a system, such as the system 102. Referring to method 400, at block 402, a user from a production support team is verified, based on authorization rules, to provide access to one or more infrastructure elements 108. The authorization rules include primary level authorization which is performed based on user id, and secondary level authorization which is performed based on role of the user, to provide a controlled access to the user. Further, login credentials may be user specific and may be associated with a role of the user in the production support team. Once the user is verified with the login credentials, the user may be provided access to one or more server platforms, such as Windows®, Linux®, or Unix®. Each of the server platforms may be associated with one of more infrastructure elements. The user may be provided access to particular server platforms based on the secondary level authorization. In an example, authorization module 212 authorizes a uses based on the authorization rules.

At block 404, based on verifying the user, ticket attributes of a ticket which includes an issue associated with the infrastructure element 108, may be obtained from a ticketing system, by the system 102. The ticketing system may log the issues and each issue may be referred to as a ticket and may have a unique identification number. Once the user is verified, the user may be notified regarding the tickets allotted to him, based on which the user may obtain ticket attribute data, from the ticketing system. In an example, the ticket attribute data may include, but not limited to, ticket id, ticket category, ticket type, ticket summary are provided to the user.

At block 406, based on the ticket attribute data, a support action to be performed on the infrastructure element 108 is received. The support action may either be an operation performed by the user based on his analysis of the issue, or operation performed by referring to available solutions from a knowledgebase. The operation may include one or more steps directed towards resolving the issue associated with the ticket.

In an implementation, the user may search in a knowledgebase, for available solutions to resolve the ticket. The knowledgebase functions as a repository to optimize information collection, and helps in easy retrieval of the collected information. The knowledgebase may include a static knowledgebase, and a dynamic knowledgebase. The static knowledgebase may be a web based external application or web-based service, which when queried, retrieves available information from its repository to help the user resolve the issue. The dynamic knowledgebase functions as a repository of previously appended operations in an operation log, which builds from time to time. In an example, when the user searches in the knowledgebase for available solutions, the ticket attributes may be associated with the search. The support action assistance module 216 may receive request for search, and search in the knowledgebase for available solution to be retrieved, based on ticket attributes.

At block 408, it may be ascertained if there are any validation rules associated with the received support action. In an example, based on rule data, it may be ascertained if any validation rules are associated with the received support action. The rule data indicates whether any rules have been described for a support action. The validation rules may be defined for a specific user, role of the user, and an infrastructure element 108 which the user has accessed. The validation rules provide a controlled access to the user for execution of certain operations.

In such cases where a validation rule is associated with the received operation, from the requested infrastructure element 108, the system 102 may prompt the user with a validation message. In an example, the validation message may require the user to input a password. In an example, the support action validation module 218 may perform the validation rule check, and provide corresponding validation message to the user.

At block 408, if it is determined that there are any validation rule checks associated with the operation, the method 400 may branch to ('Yes' branch) to block 410.

At block 410, it is ascertained whether the validation rule checks performed at block 408 are satisfied. The system 102 may ascertain if the passwords input by the users are valid. In case the validation rule check is not satisfied, the method 400 branches ('No' Branch) to block 412.

At block 412, the received operation is declined. In other words, the user may not able to execute the requested operation on the requested infrastructure element 108, since the validation rule check is not satisfied. In an example, the validation module 218 may decline the execution of the operation, if the validation rule check is not satisfied.

At block 414, the user is notified regarding the declination of the operation. In an example, the notification may be a message which simple recites 'Fail'. Such declination of received operation is also appended to the operation log 300. In an example, the validation module 218 may notify the user regarding the declined operation.

Referring back to block 408, if it is ascertained that the there are no validation rule checks associated with the operation, the method 400 proceeds to ('No' branch) block 416. Similarly, if at block 410, it is determined that the validation rule check is satisfied, the method 400 proceeds to ('Yes' branch) block 416.

At block 416, the received operation may be executed on the infrastructure element 108, to resolve the issue. In one example, the support action assistance module 216 may execute the operation on the infrastructure element 108.

At block 418, the operations performed by the user, including the execution of standard services from the service catalog, may be appended to the operation log 300. In an implementation, the operations performed by the user himself, to resolve the ticket, may also be captured and appended in the operation log. During appending the operations, the ticket attributes of the resolved ticket is also appended with the operation. In addition to indicating the user, the issue, and the infrastructure element 108 on which the operation was performed, the operation log also includes ticket attribute data of the resolved tickets. Therefore, the operation log provides context-related information, which may be used for further analysis, such as auditing, and automation of services. In an example, the log generation module 220 may append every operation performed by the user, including the validation rule check and corresponding validation messages, to the operation log 300.

FIG. 5 illustrates the method 500 for providing operations as services, using an operation log, in accordance with an embodiment of the present subject matter. In an example, the method 500 is performed by the service assistance module 222 of the system 102.

At block 502, the operation log, such as the operation log 300 is analyzed to identify at least one recurring operation, based on recurrence criteria. The recurrence criteria may be indicative of recurrence of an operation over a pre-determined number of times, in a pre-determined interval. The pre-determined interval may be understood as a time period, such as one week, in which the recurrence of a particular appended operation may be determined. In an example, the service assistance module 222 may identify the recurring operations from the operation log 300.

At block 504, the at least one recurring operation is provided as a standard service in a service catalog, based on the determining. The service catalog provides to the user, a categorized list of services that are included as support service for the infrastructure elements 108. The recurring operations may be provided as standard services in the service catalog, which may be retrieved and executed by the user. The retrieval of the standard service from a service catalog may be based on ticket attribute data associated with the resolving ticket.

Although embodiments for methods and systems for infrastructure support optimization have been described in a language specific to structural features and/or methods, it is to be understood that the invention is not necessarily limited to the specific features or methods described. Rather, the specific features and methods are disclosed as exemplary embodiments for infrastructure support optimization.

We claim:

1. An infrastructure support optimization system comprising:
   a processor; and
   a memory coupled to the processor, wherein the processor is capable of executing a plurality of modules stored in the memory, and wherein the plurality of modules comprising:
      an authorization module configured to:
         verify a user, based on authorization rules, to provide access to the user to one or more infrastructure elements from among a plurality of infrastructure elements;
      an integration module configured to:
         obtain ticket attribute data from a ticketing system, based on the verification, wherein the ticket attribute data comprises a plurality of attributes associated with a ticket to be resolved by the user, and wherein the ticket is indicative of an issue associated with an infrastructure element from among the one or more infrastructure elements;
      a support action assistance module configured to:
         receive a support action, to be performed on the infrastructure element to resolve the ticket, wherein the support action comprises at least one of an operation including one or more steps to resolve the ticket, and a standard support service; and
      a validation module coupled to the processor comprising:
         a log generation module configured to:
            append the support action to an operation log, wherein each entry in the operation log includes information pertaining to support action performed by users on the plurality of infrastructure elements, and corresponding ticket attribute data, wherein the operation log functions as a dynamic knowledge base, wherein the dynamic knowledge base serves as a repository of support actions appended to the operation log, and wherein the repository is updated at regular intervals; and
         a service assistance module configured to:
            analyze the operation log, based on recurrence criteria, to identify at least one recurring operation; and
            provide the at least one recurring operation as a standard service in a service catalog, based on the identifying.

2. The infrastructure support optimization system as claimed in claim 1, wherein the ticket attribute data comprises a ticket id, and at least one of a ticket category, a ticket type, and a ticket summary.

3. The infrastructure support optimization system as claimed in claim 1, wherein the operation log further comprises least one of a user id, a session id, and infrastructure element attributes.

4. The infrastructure support optimization system as claimed in claim 1, wherein the integration module integrates the infrastructure support optimization system with at least one of the ticketing system, configuration management database (CMDB), and a static knowledge base.

5. The infrastructure support optimization system as claimed in claim 1, wherein the support action assistance module is further configured to:
obtain a search query from the user, to resolve the ticket, the search query comprising at least one of an attribute of the ticket, user id, session id, and an attribute of an infrastructure element; and
analyze the operation log, based on the search query, to identify one or more previously appended operations in the operation log to resolve the ticket, wherein the operation to be executed on the infrastructure element is based on the one or more previously appended operations.

6. The infrastructure support optimization system as claimed in claim 1 comprising a validation module further configured to:
determine whether one or more validation rules are defined for the received operation, based on rule data, wherein the rule data comprises a plurality of validation rules corresponding to a plurality of operations, and wherein each of the plurality of validation rules is indicative of checks to be performed before a received operation is executed;
ascertain, when it is determined that the one or more validation rules are defined for the operation, whether the operation is to be executed, based on the validation rules; and
execute the operation on the infrastructure element based on the ascertaining.

7. The infrastructure support optimization system as claimed in claim 6, wherein the validation module is configured to further:
decline execution of the operation, when it is ascertained that the one or more validation rules defined for the received operation are not met; and
provide a notification to the user, wherein the notification is indicative of the declining.

8. A computer implemented method for providing support for a plurality of infrastructure elements, the method comprising:
verifying a user, based on authorization rules, to provide access to the user to one or more infrastructure elements from among the plurality of infrastructure elements;
obtaining ticket attribute data from a ticketing system, based on the verifying, wherein the ticket attribute data comprises a plurality of attributes associated with a ticket to be resolved by the user, and wherein the ticket is indicative of an issue associated with an infrastructure element from among the one or more infrastructure elements;
receiving a support action to be performed on the infrastructure element to resolve the ticket, wherein the support action comprises at least one of an operation including one or more steps to resolve the ticket, and a standard service; and
appending the support action to an operation log, wherein each entry in the operation log includes information pertaining to support action performed by users on the plurality of infrastructure elements, and corresponding ticket attribute data, wherein the operation log functions as a dynamic knowledge base, wherein the dynamic knowledge base serves as a repository of support actions appended to the operation log, and wherein the repository is updated at regular intervals;
analyzing the operation log, based on recurrence criteria, to identify at least one recurring operation; and
providing the at least one recurring operation as a standard service in a service catalog, based on the identifying.

9. The method as claimed in claim 8, wherein the ticket attribute data comprises a ticket id, and at least one of a ticket category, a ticket type, and a ticket summary.

10. The method as claimed in claim 8, wherein the operation log further comprises at least one of a user id, a session id, and infrastructure element attributes.

11. The method as claimed in claim 8, wherein the receiving further comprises:
obtaining a search query from the user, to resolve the ticket, the search query comprising at least one of an attribute of the ticket, user id, session id, and an attribute of an infrastructure element; and
analyzing the operation log, based on the search query, to identify one or more previously appended operations in the operation log to resolve the ticket, wherein the operation to be executed on the infrastructure element is based on the one or more previously appended operations.

12. The method as claimed in claim 8, wherein the authorization rules comprises rules for primary level authorization, and secondary level authorization, wherein the primary level authorization is performed based on user id, and wherein the secondary level authorization is performed based on role of the user to provide role based access control to the user.

13. The method as claimed in claim 8 further comprising:
determining whether one or more validation rules are defined for the received operation, based on rule data, wherein the rule data comprises a plurality of validation rules corresponding to a plurality of operations, and wherein each of the plurality of validation rules is indicative of checks to be performed before the received operation is executed;
ascertaining, when it is determined that the one or more validation rules are defined for the operation, whether the validation rules corresponding to the received operation are met; and
executing the operation on the infrastructure element based on the ascertaining.

14. The method as claimed in claim 13, wherein the method further comprises:
declining execution of the operation, when it is ascertained that the one or more validation rules defined for the received operation are not met; and
providing a notification to the user, wherein the notification is indicative of the declining.

15. The method as claimed in claim 13, wherein the validation rules are associated with at least one of a user, role of the user, and the infrastructure element accessible by the user.

16. A non-transitory computer-readable medium having embodied thereon a computer program for executing a method comprising:

verifying a user, based on authorization rules, to provide access to the user to one or more infrastructure element from among the plurality of infrastructure elements;

obtaining ticket attribute data from a ticketing system, based on the verifying, wherein the ticket attribute data comprises a plurality of attributes associated with a ticket to be resolved by the user, and wherein the ticket is indicative of an issue associated with an infrastructure element from among the one or more infrastructure elements;

receiving a support action to be performed on the infrastructure element to resolve the ticket, wherein the support action comprising at least one of an operation including one or more steps to resolve the ticket, and a standard support service; and appending the support action to an operation log, wherein each entry in the operation log includes information pertaining to support action performed by users on the plurality of infrastructure elements, and corresponding ticket attribute data, wherein the operation log functions as a dynamic knowledge base, wherein the dynamic knowledge base serves as a repository of support actions appended to the operation log, and wherein the repository is updated at regular intervals;

analyzing the operation log, based on recurrence criteria, to identify at least one recurring operation; and providing the at least one recurring operation as a standard service in a service catalog, based on the identifying.

17. The non-transitory computer-readable medium executing the method as claimed in claim 16, the method further comprising:

determining whether one or more validation rules are defined for the received operation, based on rule data, wherein the rule data comprises a plurality of validation rules corresponding to a plurality of operations, and wherein each of the plurality of validation rules is indicative of checks to be performed before the received operation is executed;

ascertaining, when it is determined that the one or more validation rules are defined for the operation, whether the validation rules corresponding to the received operation are met; and executing the operation on the infrastructure element based on the ascertaining.

18. The non-transitory computer-readable medium executing the method as claimed in claim 17, the method further comprising:

declining execution of the operation, when it is ascertained that the one or more validation rules defined for the received operation are not met; and providing a notification to the user, wherein the notification is indicative of the declining.

* * * * *

UNITED STATES PATENT AND TRADEMARK OFFICE
CERTIFICATE OF CORRECTION

| | |
|---|---|
| PATENT NO. | : 9,531,725 B2 |
| APPLICATION NO. | : 14/494762 |
| DATED | : December 27, 2016 |
| INVENTOR(S) | : Veena Sadashiv Deshmukh et al. |

It is certified that error appears in the above-identified patent and that said Letters Patent is hereby corrected as shown below:

On the Title Page

At Item (72), change inventor name "RAHU" to -- RAHUL --.

At Item (73), change assignee "TATA CONSULTANCY SERVICES" to -- TATA CONSULTANCY SERVICES LIMITED --.

Signed and Sealed this
Second Day of August, 2022

Katherine Kelly Vidal
*Director of the United States Patent and Trademark Office*